(12) United States Patent
Allasia et al.

(10) Patent No.: US 11,516,141 B2
(45) Date of Patent: Nov. 29, 2022

(54) DYNAMIC BANDWIDTH CONTROL OVER A VARIABLE LINK

(71) Applicant: TELECOM ITALIA S.p.A., Milan (IT)

(72) Inventors: Andrea Allasia, Turin (IT); Franco Canavese, Turin (IT); Giuseppe Fioccola, Turin (IT); Chiara Moriondo, Turin (IT); Antonia Paolicelli, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 0 days.

(21) Appl. No.: 16/319,884

(22) PCT Filed: Aug. 2, 2016

(86) PCT No.: PCT/EP2016/068397
§ 371 (c)(1),
(2) Date: Jan. 23, 2019

(87) PCT Pub. No.: WO2018/024315
PCT Pub. Date: Feb. 8, 2018

(65) Prior Publication Data
US 2019/0268274 A1    Aug. 29, 2019

(51) Int. Cl.
*H04L 47/263* (2022.01)
*H04L 12/46* (2006.01)
(Continued)

(52) U.S. Cl.
CPC ........ *H04L 47/263* (2013.01); *H04L 12/4641* (2013.01); *H04L 47/2408* (2013.01);
(Continued)

(58) Field of Classification Search
CPC ............... H04L 47/263; H04L 12/4641; H04L 47/2408; H04L 47/25; H04L 47/34; H04L 69/22; H04W 28/02; H04W 28/0289
See application file for complete search history.

(56) References Cited

U.S. PATENT DOCUMENTS 6,505,253 B1 * 1/2003 Chiu ................... H04L 12/1868
370/229
6,587,437 B1    7/2003 Lee et al.
(Continued)

OTHER PUBLICATIONS

International Search Report dated Feb. 8, 2017 in PCT/EP2016/068397, 4 pages.
(Continued)

*Primary Examiner* — Candal Elpenord
*Assistant Examiner* — Xuan Lu
(74) *Attorney, Agent, or Firm* — Oblon, McClelland, Maier & Neustadt, L.L.P.

(57) ABSTRACT

A method for controlling a bandwidth over a communication link connecting first and second client network elements. The first element is configured to send to the second element data traffic including at least a best effort traffic flow of packets. The method includes: at the first element, marking a number of best effort packets with a control code, the control code taking values within a predetermined ordered control sequence of values, and sending the marked packets to the second element through the link; at the second element, checking the control code of each marked best effort packet and, in case of detection of a missing value of the control code, sending to the first element a packet containing a feedback code indicative of an adjustment of the bandwidth; and, at the first element, upon reception of the feedback code, adjusting the bandwidth.

15 Claims, 5 Drawing Sheets

(51) Int. Cl.
*H04L 47/2408* (2022.01)
*H04L 47/25* (2022.01)
*H04L 47/34* (2022.01)
*H04L 69/22* (2022.01)
*H04W 28/02* (2009.01)

(52) U.S. Cl.
CPC .............. *H04L 47/25* (2013.01); *H04L 47/34* (2013.01); *H04L 69/22* (2013.01); *H04W 28/02* (2013.01); *H04W 28/0289* (2013.01)

(56) References Cited

U.S. PATENT DOCUMENTS

| | | | | |
|---|---|---|---|---|
| 6,628,610 | B1* | 9/2003 | Waclawsky | H04L 47/10 370/229 |
| 6,804,244 | B1* | 10/2004 | Anandakumar | H04L 1/0001 370/328 |
| 2003/0223368 | A1* | 12/2003 | Allen, Jr. | H04L 47/12 370/235 |
| 2007/0115812 | A1* | 5/2007 | Hughes | H04L 1/1887 370/395.21 |
| 2007/0280245 | A1* | 12/2007 | Rosberg | H04L 47/10 370/392 |
| 2009/0296613 | A1 | 12/2009 | Khan et al. | |
| 2012/0327779 | A1* | 12/2012 | Gell | H04L 47/2475 370/235 |
| 2013/0077486 | A1* | 3/2013 | Keith | H04L 47/22 370/230.1 |
| 2013/0124754 | A1* | 5/2013 | Kutscher | H04L 47/31 709/235 |
| 2014/0126357 | A1 | 5/2014 | Kulkarni et al. | |
| 2014/0286173 | A1 | 9/2014 | Bhandari et al. | |
| 2015/0222555 | A1 | 8/2015 | Rickeby et al. | |
| 2016/0315830 | A1* | 10/2016 | Cote | H04L 47/52 |
| 2018/0295555 | A1* | 10/2018 | Xiong | H04L 47/196 |

OTHER PUBLICATIONS

De Martin. J.C., et al., "Distortion-based packet marking for MPEG video transmission over diffserv networks", IEEE International Conference on Multimedia and Expo, XP32177003, 2001, pp. 521-524.

Long, H., et al., "OSPF Routing Extension for Links with Variable Discrete Bandwidth", Network Working Group, Internet Draft, Oct. 16, 2015, pp. 1-7.

Long, H., et al., "Ethernet Traffic Parameters with Availability Information", Network Working Group, Internet Draft, Feb. 19, 2016, pp. 1-10.

* cited by examiner

DYNAMIC BANDWIDTH CONTROL OVER A VARIABLE LINK

TECHNICAL FIELD

The present invention relates to the field of communication systems and networks. In particular, the present invention relates to a method and a system for a dynamic control of the bandwidth over a variable link, in particular a radio (or, microwave) link.

BACKGROUND ART

As known, a radio link of a communication network may be affected by fading due to, for instance, bad weather conditions. Rain may attenuate the signal transmitted over the radio link and deteriorate the performances of the communication network such as the signal to noise ratio.

It is also known that the radio transceivers at both ends of the radio link may monitor the radio link and control the bandwidth (or, capacity) available thereon. In case of fading, the radio transceivers may apply a known technique for adapting the bandwidth of the radio link to the deteriorated transmission conditions. Such an algorithm may be the known Adaptive Coding and Modulation (ACM) technique, which provides for reducing the transmission rate of the symbols over the radio link in order to preserve the signal to noise ratio.

The data traffic transmitted over the radio link may comprise traffic flows coming from network apparatuses such as routers, eNodeB's, etc. attached to the radio transceivers. These traffic flows typically have different types of priority or, in other words, different classes of service. For instance, a radio link may carry different traffic flows belonging to a same VLAN (Virtual Local Area Network). Some of these traffic flows usually are high priority traffic flows (for instance VoIP data), while other are best effort traffic flows (for instance, web navigation data). As known, the physical interfaces of the radio link may be divided into multiple logical interfaces (VLAN sub-interfaces) tagged with different VLAN identifiers. Each VLAN sub-interface may carry a data traffic with traffic flows of different priorities.

Typically, managing traffic prioritization is performed according to a QoS (Quality of Service) management mechanism which is implemented in the network elements. Moreover, as known, different and independent QoS mechanisms and processes are usually implemented in client and server networks. On an output interface of a router apparatus, the QoS mechanism of the client network typically provides for allocating the necessary bandwidth for the high priority traffic flow and for adjusting the bandwidth of the best effort traffic flows according to the remaining available capacity of the interface. In the server network, the relevant QoS mechanism provides for allocating the necessary bandwidth for the high priority traffic flow and for adjusting the bandwidth of the best effort traffic flows according to the available bandwidth on the radio link, which, as mentioned above, may vary dynamically because of the conditions of the link, which are mainly affected by weather conditions, and in accordance with an adaptive modulation and coding technique.

US 2014/0286173 discloses a method in one example including receiving a current bandwidth characteristic for a link, where the current bandwidth characteristic is determined under fading conditions associated with signal propagation on the link. The method can also include calculating a new cost for the link that is different from a nominal cost associated with a nominal bandwidth of the link without the fading conditions. The method could also include routing at least a portion of a plurality of flows that are to traverse the link away from the link based, at least in part, on the new cost. Another example method includes receiving the current bandwidth characteristic for the link, comparing the current bandwidth characteristic with a preconfigured low watermark corresponding to a class-specific MTR topology associated with a class of traffic traversing the link, and removing the link from the MTR topology based on the current bandwidth characteristic.

IETF document "OSPF Routing Extension for Links with Variable Discrete Bandwidth", draft-ietf-ccamp-ospf-availability-extension-03.txt, Oct. 16, 2015, discloses an optional ISCD Availability sub-TLV in OSPF routing protocol, which can be used for route computation in a network that contains links with variable discrete bandwidth.

IETF document "Ethernet Traffic Parameters with Availability Information", draft-ietf-ccamp-rsvp-te-bandwidth-availability-04.txt, Feb. 19, 2016, discloses an optional Availability TLV in Resource ReSerVation Protocol-Traffic Engineer (RSVP-TE) signalling, which can be used to set up a label switching path (LSP) in a Packet Switched Network (PSN) that contains links with discretely variable bandwidth.

SUMMARY OF THE INVENTION

The Applicant has noticed that the QoS mechanisms that are implemented in a client apparatus, such as a router, and in the link of the server network connecting the client apparatus to another client apparatus run uncoordinated processes. This often leads to a waste of network resources (namely, the bandwidth of the server network).

Moreover, the Applicant has noticed that according to US 2014/0286173, a microwave transceiver may communicate the bandwidth of a radio link under fading conditions to a connected router through a mechanism based on extensions of ITU-T Y.1731 protocol. Therefore, the communication of the available bandwidth is exchanged between the microwave transceiver and the router in a specific OAM (Operations, Administration, and Maintenance) packet. The router may then act on the received bandwidth information by triggering, for instance, path re-computation such that traffic is shifted away gradually from the degraded radio link upon occurrence of fading conditions.

However, this approach has some disadvantages. Indeed, the microwave transceiver must be capable of managing specific OAM packets, which often requires a specific hardware and software implementation. Moreover, the bandwidth communication mechanism that is implemented based on extensions of ITU-T Y.1731 protocol is performed on a physical port basis. Therefore, the method of US 2014/0286173 does not provide for managing the QoS of traffic flows on logical ports, such as for instance on a router's VLAN sub-interfaces.

In view of the above, the Applicant has tackled the problem of providing a method and a system for a dynamic control of the bandwidth over a variable link, in particular a radio (or, microwave) link, which overcomes the aforesaid drawbacks. In particular, the Applicant has tackled the problem of providing a method and a system for a dynamic control of the bandwidth over a variable link, in particular a radio (or, microwave) link, which allows using efficiently the network resources, which does not require any specific hardware and/or software implementation on the radio transceiver and which, at the same time, may be applied on a sub-interface basis.

In the following description and in the claims, the expression "variable link" will indicate a communication link with a variable bandwidth (due to, for instance, fading conditions).

Moreover, the expression "best effort traffic flow" or "best effort packet" will indicate a flow of packets or a single packet with low priority.

According to a first aspect, the present invention provides a method for controlling a bandwidth over a communication link connecting a first client network element and a second client network element, wherein the first client network element is configured to send to the second client network element data traffic comprising at least a best effort traffic flow of packets, the method comprising:

at the first client network element, marking a number of best effort packets of the best effort traffic flow with a respective control code, the control code taking, in each of the number of best effort packets, a value within a predetermined ordered control sequence of values, and sending the marked best effort packets to the second client network element through the link;

at the second client network element, checking the control code of each marked best effort packet and, in case of detection of a missing value of the control code within the control sequence, sending to the first client network element a packet containing a feedback code indicative of an adjustment of the bandwidth; and at the first client network element, upon reception of the packet containing the feedback code, adjusting the bandwidth.

Preferably, marking at the first client network element comprises writing the control code into a number of bits of a header of the best effort packet. Preferably, the number of bits is comprised in a diffsery field of an internet protocol header of the best effort packet.

According to embodiments of the present invention, the control sequence of values in the best effort packets is a sawtooth sequence or a triangle sequence of values in a range between a minimum integer value and a maximum integer value.

Preferably, checking at the second client network element comprises setting an alert counter to a an initial value and incrementing the alert counter by 1 in case of the detection of one missing value of the control code within the control sequence.

Preferably, checking at the second client network element further comprises comparing a current value of the alert counter with a threshold and sending to the first client network element a packet containing a feedback code is performed when the current value of the alert counter exceeds the threshold.

Preferably, the packet containing a feedback code is a best effort packet sent from the second client network element to the first client network element.

Preferably, the feedback code takes a fixed value selected within the predetermined ordered control sequence of values.

Preferably, the feedback code is indicative of a reduction of the bandwidth.

Preferably, at the first client network element, adjusting the bandwidth comprises reducing the bandwidth by a predetermined discrete amount. Preferably, the predetermined discrete amount is a fixed fraction of a total bandwidth of a best effort traffic of the interface.

Preferably, the method further comprises, at the first client network element, increasing the bandwidth when the best effort packets are marked with control codes comprising a pre-determined number of the control sequences without receiving, in the meanwhile, any packet containing the feedback code from the second client network element. Preferably, increasing the bandwidth comprises increasing the bandwidth by a further predetermined discrete amount.

According to a second aspect, the present invention provides a communication network comprising a first client network element and a second client network element connected through a communication link, wherein the first client network element is configured to send to the second client network element data traffic comprising at least a best effort traffic flow of packets, wherein the first client network element is configured to:
mark a number of best effort packets of the best effort traffic flow with a respective control code, the control code taking, in each of the number of best effort packets, a value within a predetermined ordered control sequence of values; and
send the marked best effort packets to the second client network element through the link, wherein the second client network element is configured to:
check the control code of each marked best effort packet and, in case of detection of a missing value of the control code within the control sequence, send to the first client network element a packet containing a feedback code indicative of an adjustment of the bandwidth, and wherein the first client network element is further configured to, upon reception of the packet containing the feedback code, adjust the bandwidth.

Preferably, the bandwidth is the bandwidth of a VLAN sub-interface of a physical interface of the first client network element and the second client network element towards the link.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
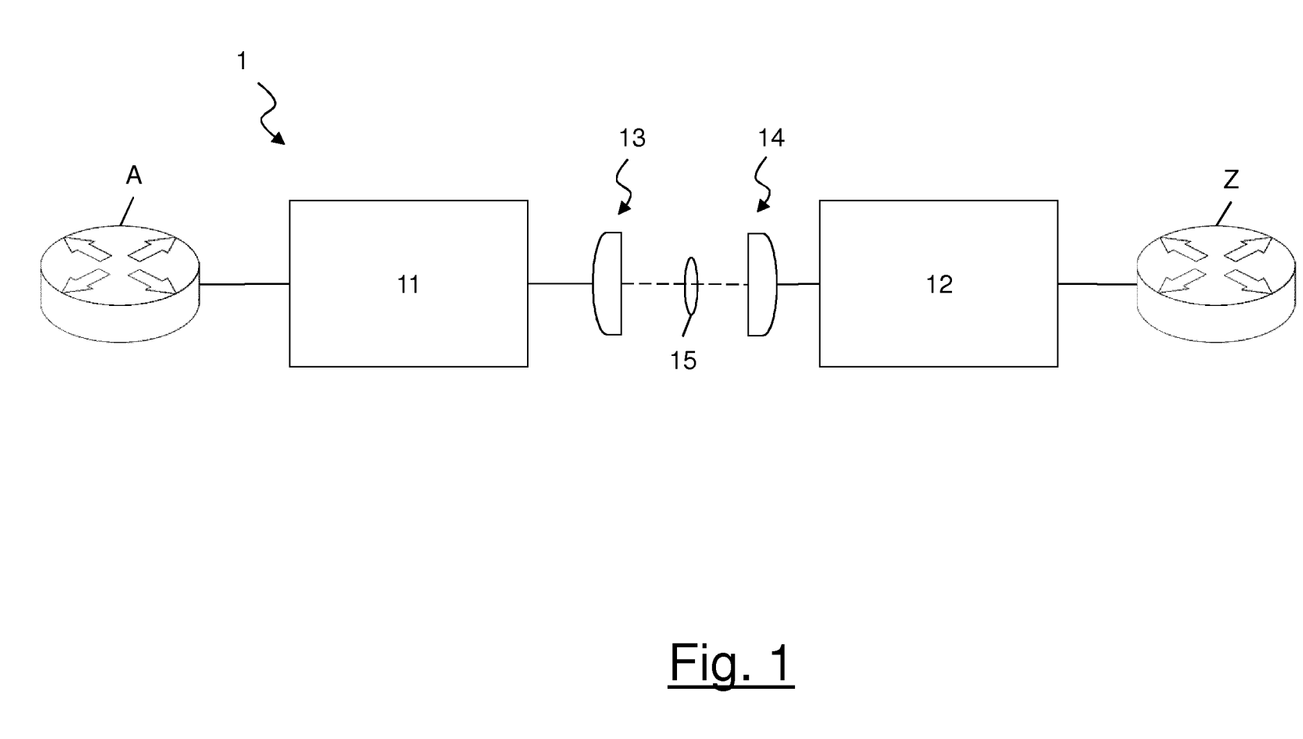
FIG. 1 schematically shows a client network comprising two routers and a radio link between them.

FIG. 1 schematically shows an exemplary communication network 1 for implementing the method according to the present invention. The communication network 1 shown in FIG. 1 is a client network and it preferably comprises a first client network element A and a second client network element Z configured to exchange packets over a communication link. The first client network element A and the second client network element Z may be Layer 3 (L3) routers, e.g. IP (Internet Protocol) routers, or Layer 2 (L2) Ethernet switches of a backhaul IP communication network. The first client network element A and the second client network element Z may also be eNodeB's of an LTE (Long Term Evolution) communication network. In a further embodiment, the first client network element A may be an apparatus of a mobile core network and the second client network element Z may be an eNodeB. The first client network element A and the second client network element Z may also be MPLS (Multi Protocol Label Switching) routers. In the following description, for sake of not limiting example, the first network element A and the second network element Z will be referred to as "first router A" and "second router Z", respectively.

Preferably, the first network element A and the second network element Z are connected via a communication link 15 of a server network. In particular, the communication link 15 may be a point-to-point radio (or, microwave) link. In this case, the first router A is preferably connected to a first radio, or microwave, equipment 11, which comprises a first microwave antenna 13. Analogously, the second router Z is preferably connected to a second radio equipment 12, which comprises a second microwave antenna 14.

It is to be noticed that the client network 1 depicted in FIG. 1 with a radio link connecting the routers A, Z is merely an example of a network in which the method of the present invention may be implemented. Indeed, the method of the present invention may be analogously applied to control the bandwidth of other types of link having a variable bandwidth.

For sake of example, it is assumed that each of the first router A and the second router Z has a number of physical interfaces and that each physical interface may have a number of VLAN sub-interfaces. The radio link 15 is connected to a respective physical interface of each of the first router A and the second router Z. The data traffic carried over a VLAN sub-interface of the physical interface towards the radio link 15, may transport a number of different services over packets, in particular IP packets, having different (IP) source addresses and (IP) destination addresses.

In particular, each of the first router A and the second router Z is configured to implement a QoS mechanism, preferably a QoS mechanism based on the known Differentiated Services (DiffServ) architecture. At each router A, Z, the data traffic carried over a VLAN sub-interface may comprise different traffic flows, each comprising packets associated with different priorities or classes of service: for instance, the data traffic may comprise a high priority traffic flow and a best effort traffic flow. Both the best effort traffic flow and the high priority traffic flow may comprise UDP (User Datagram Protocol) packets and TCP (Transmission Control protocol) packets. As known, TCP packets are typically subject to a flow control mechanism that provides for re-transmission of missed packet, while UDP packets are not re-transmitted.

Preferably, the first microwave equipment 11 and the second microwave equipment 12 are configured to implement a link adaptation technique suitable for adjusting the modulation, coding and other signal parameters to the conditions of the radio link 15. In particular, the first radio equipment 11 and the second radio equipment 12 may be configured to implement a known adaptive coding and modulation (ACM) technique.

Figure 2:
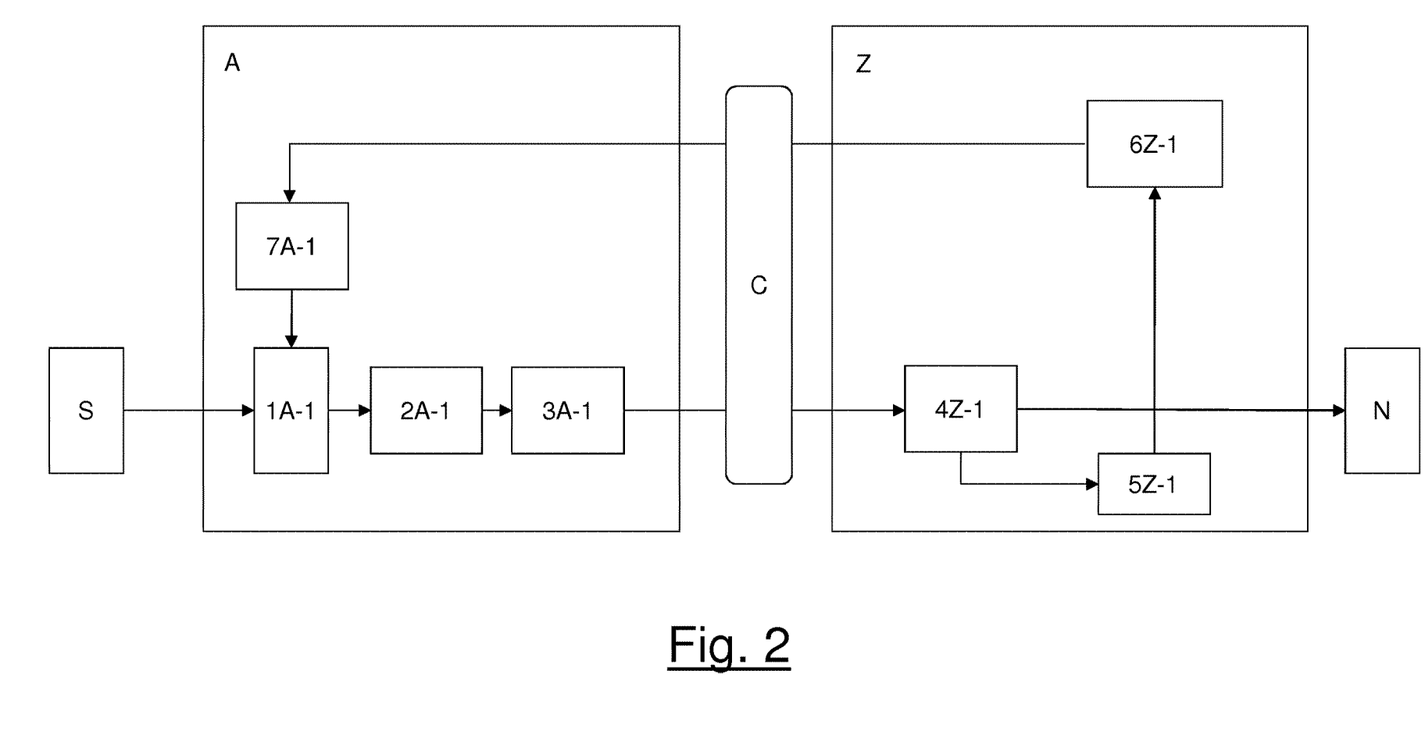
FIG. 2 is a block scheme of the routers according to a first embodiment of the present invention.

FIG. 2 shows a block scheme of the first router A and the second router Z according to a first embodiment of the present invention. In FIG. 2, the first and second radio equipment 11, 12 and the radio link 15 are represented by block "C", which will be indicated in the following description as "server network". Indeed, the operation of the first and second radio equipment 11, 12 will not be described herein after as it is known to a person skilled in the art and it is not relevant to the present description.

According to this embodiment, a unidirectional data traffic generated by a source S is preferably transmitted from the first router A to the second router Z. The source S may be, for instance, a network apparatus of a service provider. This situation may represent a multicast data communication. The block scheme depicted in FIG. 2 is merely exemplary as other network elements (such as further routers) may be interposed between the source S and the first router A.

The first router A preferably comprises a rate limiter 1A-1, a packet counting module 2A-1, a policer 3A-1 and a feedback controller 7A-1. The rate limiter 1A-1, the packet counting module 2A-1 and the policer 3A-1 are preferably connected in cascade from an input interface of the first router A connected to the source S towards an output interface of the first router A connected to the server network C. The feedback controller 7A-1 is connected to an input interface from the server network C and provides a feedback command to the rate limiter 1A-1.

The second router Z preferably comprises a packet checking module 4Z-1, an alert generating module 5Z-1 and a feedback module 6Z-1. The packet checking module 4Z-1 is connected to the input interface of the second router Z connected to the radio server network C, and the alert generating module 5Z-1 is connected in cascade to the packet checking module 4Z-1. The output of the alert generating module 5Z-1 is connected to the feedback module 6Z-1 which in turn is connected to an output interface of the second router towards the radio server network C. The feedback controller 7A-1 of the first router A and the feedback module 6Z-1 of the second router Z provide a feedback loop from the second router Z to the first router A that serves the purpose of adjusting the available bandwidth over the radio link 15, as it will be described in detail herein after.

The components of the first router A and the second router Z depicted in FIG. 2 may be implemented as software modules (in particular, software agents) to be run on computers or processors or hardware modules running a dedicated software.

The source S preferably generates a data traffic comprising at least a best effort traffic flow. The data traffic generated by the source S may be carried over a specific VLAN. Moreover, the source S may generate a number of traffic flows corresponding to services with different priorities, for instance a high priority traffic flow, over the same VLAN.

According the present invention, the data traffic generated by the source S is processed at the first router A, which shall send the packets of the data traffic to the second router Z though the server network C. The first router A is preferably configured to send the data traffic over the considered specific VLAN on a corresponding sub-interface of its physical interface connected to the server network C. In the following description, for sake of simplicity, reference will be made to a data traffic carried over a VLAN sub-interface of the routers. However, this is not limiting as the present invention is likewise applicable by considering any data traffic exchanged between two elements of a communication network, either over a logical interface or over a physical interface of the network elements.

The packets of the data traffic received at the first router A are preferably processed by the rate limiter 1A-1. The rate limiter 1A-1 preferably adjusts the bandwidth of the data traffic to be sent over the considered VLAN sub-interface. Such an adjustment is preferably performed on the basis of a feedback command generated by the second router Z indicative of the conditions of the radio link 15, as it will be described herein after. However, at the start of the packet transmission from the first router A to the second router Z, the rate limiter 1A-1 preferably adjusts the bandwidth of the data traffic to the nominal bandwidth of the radio link 15.

The packet counting module 2A-1 preferably classifies the packets of each traffic flow (such as best effort traffic flow and other traffic flows with different priorities such as the high priority traffic low) and identifies each best effort packet of the data traffic on the basis of, for instance, a class map. This identification may also be based on a policy or a firewall filter or an access list. In particular, the packet counting module 2A-1 is preferably configured to read the 8-bit DiffServ (Differentiated Services) field of the IP header of the packet and to identify the 6-bit differentiated services code point (DSCP) therein, in order to select the best effort packets. Indeed, the first three most significant bits of the DSCP define a precedence level (which may take a value between 0 and 7) and are copied over Ethernet priority bits.

Then, the packet counting module 2A-1 preferably marks each best effort packet with a control code. This operation is preferably performed by writing a control code into a number of bits of a packet header, which will be referred to in the following description and in the claims as "control code bits". According to a preferred embodiment of the present invention, the control code is written into a number of bits of the DiffServ field of the IP header of the best effort packet and in particular it is overwritten onto the three least significant bits of the DSCP (bit 3 to bit 5). Alternatively, the control code may be written on other available bits of any header comprised within the packet and formatted according to an encapsulated protocol. For instance, according to the IPv6 protocol, the packet may comprise an extension header comprising bits dedicated to the control code.

Preferably, the control code may be set as follows.

A-i. At the first router A (namely, the router that is sending data traffic over the server network C) a counter is initialized with an initial value, e.g. 0.

A-ii. When the first best effort packet is processed at the first router A, the initial value of the counter is written into the control code bits of this first best effort packet.

A-iii. For each subsequent best effort packet of the considered data traffic which is processed at the first router A, the counter is incremented by 1 and its current value is written into the control code bits of best effort packet.

A-iv. When the marking counter reaches a maximum value, e.g. 7, the counter is preferably restarted from its initial value, namely 0.

A-v. Then, for each subsequent best effort packet, the procedure of steps A-iii and A-iv is preferably repeated.

Figure 3:
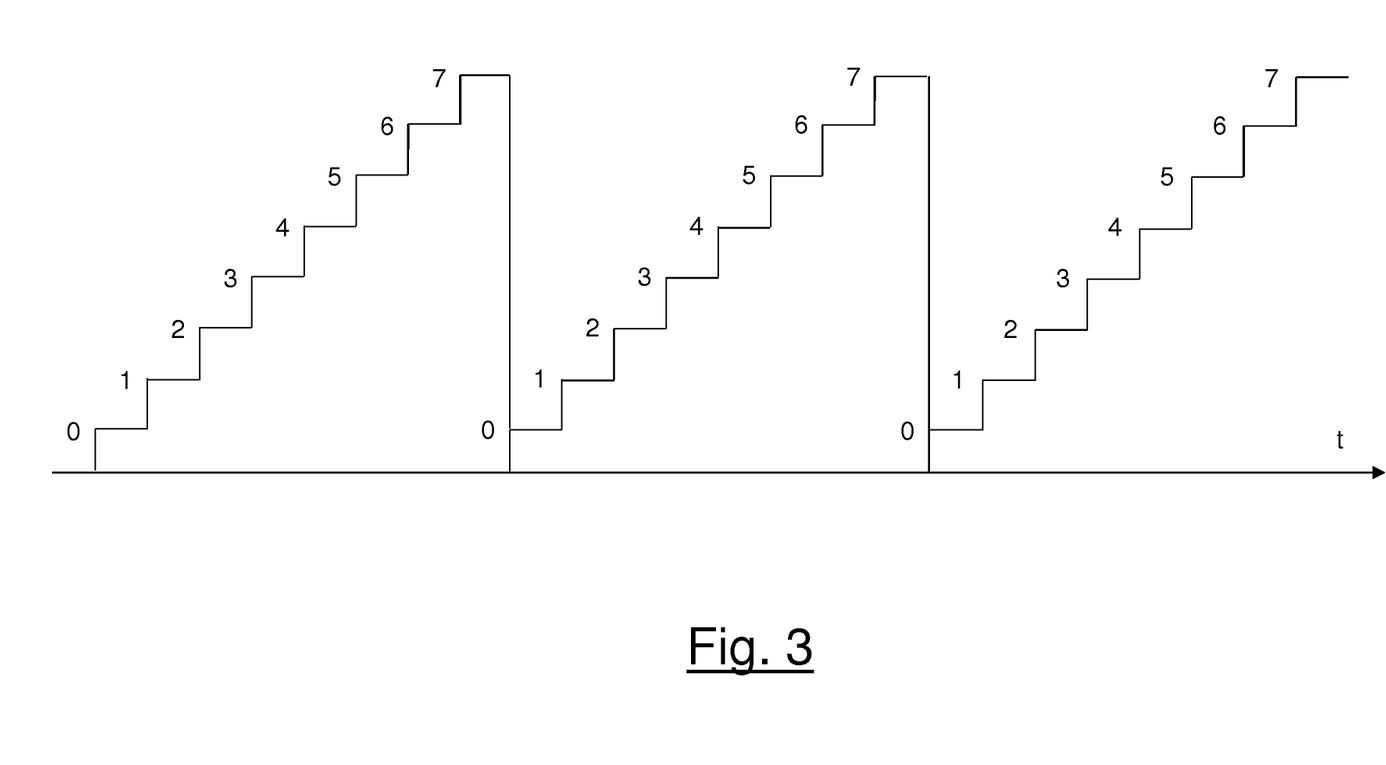
FIG. 3 represents a marking identifier according to a sawtooth shape sequence, according to embodiments of the present invention.

According to the procedure above, the control code preferably takes the values represented in FIG. 3. The sequence of the values of the control code is an ordered sequence of integer numbers and it will be indicated herein after also as control sequence. According to this embodiment of the present invention, the sequence of values of the control code is preferably a sawtooth sequence, wherein the value of the control code is incremented by 1 for each subsequent best effort packet that is to be sent over the server network C, from a minimum value, e.g. equal to 0, to a maximum value, e.g. equal to 7. When the control code reaches the maximum value, the sequence is preferably restarted.

According to alternative embodiments, at step A-iii above, the counter may be incremented each time a fixed number of best effort packets are processed, or periodically at fixed intervals of time. In these cases, each value of the control code is not associated with a single packet but it is associated with a number of best effort packets within the traffic flow transmitted over the considered VLAN sub-interface.

Figure 4:
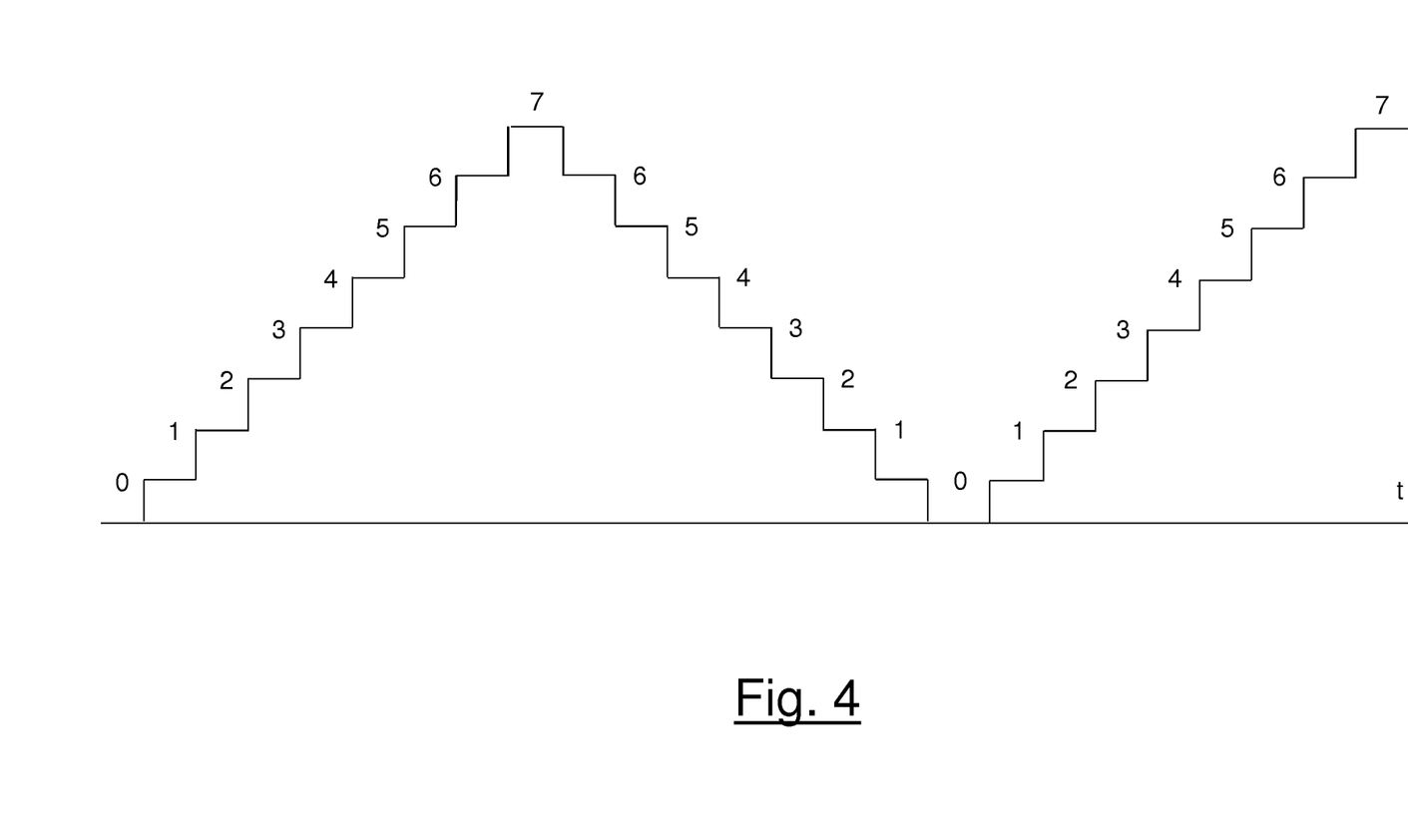
FIG. 4 represents a marking identifier according to a triangle shape sequence, according to other embodiments of the present invention.

Alternatively, as represented in FIG. 4, the sequence of values of the control code is a triangle sequence. According to this embodiment, the control code is set by performing steps A-i to A-iii described above, while at step A-iv, when the control code reaches the maximum value, e.g. 7, it is preferably decremented by 1. Then, for each subsequent best effort packet, the counter continues being decremented by 1 until a minimum value is reached, which may be equal to the counter's initial value (e.g. 0). Then, the sequence is preferably restarted so that, for each further subsequent best effort packet, the counter is again incremented by 1 until the maximum value is reached, and so on.

The procedure of steps A-i to A-v described above is preferably performed independently for each best effort traffic flow carried over each VLAN sub-interface which is configured on the physical interface of the first router A towards the radio link 15, and is applied to each best effort packet that is to be sent over the server network C.

The policer 3A-1 preferably receives all the packets of the data traffic to be sent over the considered VLAN sub-interface (namely, the best effort traffic flow processed by the packet counting module 2A-1 and possibly other traffic flows with different priorities, such as the high priority traffic flow) and queues them to the physical interface of the first router A towards the server network C. The policer 3A-1 preferably queues the packets to be sent according to the (time varying) available bandwidth over the radio link 15 and a router's QoS scheduling algorithm, which provides for allocating a given percentage of the available bandwidth to the high priority traffic (namely, a percentage of the bandwidth that guarantees transmission of all the high priority traffic) and the remaining available bandwidth to the best effort packets. For instance, the scheduling algorithm may provide for allocating 30% of the available bandwidth to the high priority traffic and 70% of the available bandwidth to the best effort traffic.

At the second router Z, the packet checking module 4Z-1 preferably receives the packets of the data traffic sent by the first router A over the considered VLAN sub-interface and identifies the best effort packets on the basis of, for instance, a class map. As already cited above, this identification may also be based on a policy or a firewall filter or an access list. One class map per each specific VLAN sub-interface is preferably used. Then, for each best effort packet of the traffic flow carried over the VLAN sub-interface, the packet checking module 4Z-1 preferably checks the control code inserted therein. In the meanwhile, the packet checking module 4Z-1 preferably sets an alert counter to an initial value preferably equal to 0. Then, the packet checking module 4Z-1 preferably performs the following actions:

Z-i. reads the control code bits in the header of each best effort packet (e.g. the three least significant bits of the DSCP); and Z-ii. checks whether the value of the control code of the current best effort packet correspond to an expected value that guarantees the continuity of the control sequence used to update the counter at the first router A. If the value of the control code of the current best effort packet corresponds to the expected vale, no action is preferably taken and the alert counter is set to its initial value equal to 0. If, on the contrary, the value of the control code of the current best effort packet does not correspond to the expected value (this condition will be also referred to as control sequence violation), the alert counter is preferably incremented by 1.

The check of step Z-ii above may be performed by comparing the value of the control code of the current best effort packet and the value of the control code of the preceding best effort packet. For instance, in case the control sequence of triangle shape is used (see FIG. 4), the packet checking module 4Z-1 preferably checks the difference between the value of the control code of the current best effort packet and the value of the control code of the preceding best effort packet. If the difference is equal to the absolute value of 1, no action is taken as the control code is indicating a correct value within the selected marking sequence. If, however, the difference is not equal to the absolute value of 1, the alert counter is incremented by 1.

As described above, the alert counter is incremented when a missing code value is detected within the sequence of control code values of the best effort packets. This violation within the control sequence indicates a missing packet within the sequence of best effort packets carried over the considered VLAN sub-interface. This means that the available bandwidth over the radio link 15 is lower than the bandwidth which is required to transmit all the best effort packets that are to be sent over the radio link 15. The lowering of the available bandwidth may be due to fading (e.g. caused by bad weather conditions) which is affecting the radio link 15. In this case, according to the present invention, consequent actions are taken by the first and second routers A, Z on the bandwidth of the considered VLAN sub-interface, as it will be described herein after.

The alert checking module 5Z-1 preferably compares the current value of the alert counter with a predetermined threshold value. For instance the threshold value for the alert counter may be equal to 3.

If the value of the alert counter is greater than the threshold (which means that at least a number of control sequence violations occurred equal to the threshold value), the alert checking module 5Z-1 preferably generates and sends a corresponding feedback command to the feedback module 6Z-1.

The feedback module 6Z-1, upon reception of the feedback command, preferably generates a control packet to be sent to the first router A. The control packet preferably contains a feedback code indicating which adjustment shall be taken by the first router A on the bandwidth of the considered VLAN sub-interface. The feedback code preferably corresponds to the control code, and its value is set to one of predetermined fixed values selected among the values that the control code may take, as it will be described in detail herein after. The feedback code is preferably written in the same bits of the packet's header used as control code bits. These bits are, for instance, the least three significant bits of the DSCP.

In particular, the feedback command preferably indicates that the bandwidth of the considered VLAN sub-interface shall be reduced at the first router A. In this case, the predetermined fixed value of the feedback code is equal to, for instance, 1.

The feedback module 6Z-1, upon reception of the feedback command, preferably generates a control packet to be sent to the first router A and inserts the feedback code therein. The control packet is preferably a best effort packet, in particular an IP packet having a best effort class of service. The feedback code is preferably inserted in the control packet in correspondence of the same bits used as control code bits of a best effort packet (e.g. the three least significant bits of the DSCP). The control packet is preferably sent to the first router A through the server network C.

At the first router A, upon reception of a control packet, the feedback controller 7A-1 preferably checks the control packet, in particular it checks the bits carrying the feedback code of the control packet. If the value of the feedback code corresponds to the predetermined fixed value indicating that the bandwidth shall be reduced, it generates a bandwidth adjustment command to the rate limiter 1A-1, which indicates to reduce the bandwidth of the considered VLAN sub-interface. Generation of the bandwidth adjustment command may be performed after reception of a pre-determined number of control packets, e.g. three control packets.

Reduction of the bandwidth is preferably performed in a discrete manner. Upon reception of a bandwidth adjustment command from the feedback controller 7A-1, the rate limiter 1A-1 preferably decreases the bandwidth of the considered VLAN sub-interface by a first predetermined discrete amount. Preferably, the first predetermined discrete amount is a fixed fraction of the total bandwidth of the best effort traffic of the considered VLAN sub-interface, for instance equal to 1/16 of the bandwidth of the best effort traffic of the considered VLAN sub-interface.

Preferably, in case the alert counter at the alert checking module 5Z-1 of the second router Z is lower than the threshold value, no feedback command is sent by the alert checking module 5Z-1 to the feedback module 6Z-1.

Then, at the first router A, in the absence of a control packet, the rate limiter 1A-1 preferably increases the bandwidth of the considered VLAN sub-interface at discrete steps, wherein at each step the bandwidth is increased by a second predetermined discrete amount. This second predetermined discrete amount may be equal to the first predetermined discrete amount mentioned above, for instance equal to 1/16 of the bandwidth of the best effort traffic of the considered VLAN sub-interface. The increase of the bandwidth is preferably performed by the rate limiter 1A-1 at discrete steps as described herein below. Preferably, the rate limiter 1A-1 increases the bandwidth by the second predetermined discrete amount when, at the first router A, a number of consecutive best effort packets is marked with values of the control code comprising a pre-determined number of consecutive control sequences without receiving, in the meanwhile any control packet with the feedback code. For instance, the increase in the bandwidth may be performed when a number of best effort packets are generated comprising values of three consecutive sawtooth sequences (as represented in FIG. 3), provided that no control packet is received in the meanwhile.

The bandwidth may be increased at consecutive discrete steps, each step involving the check on the control code described above, until the nominal bandwidth is reached.

Once the packets have been processed as described above at the second router Z, they are sent to other network elements, as depicted in FIG. 2 (this is represented by the block N in the Figure).

Figure 5:
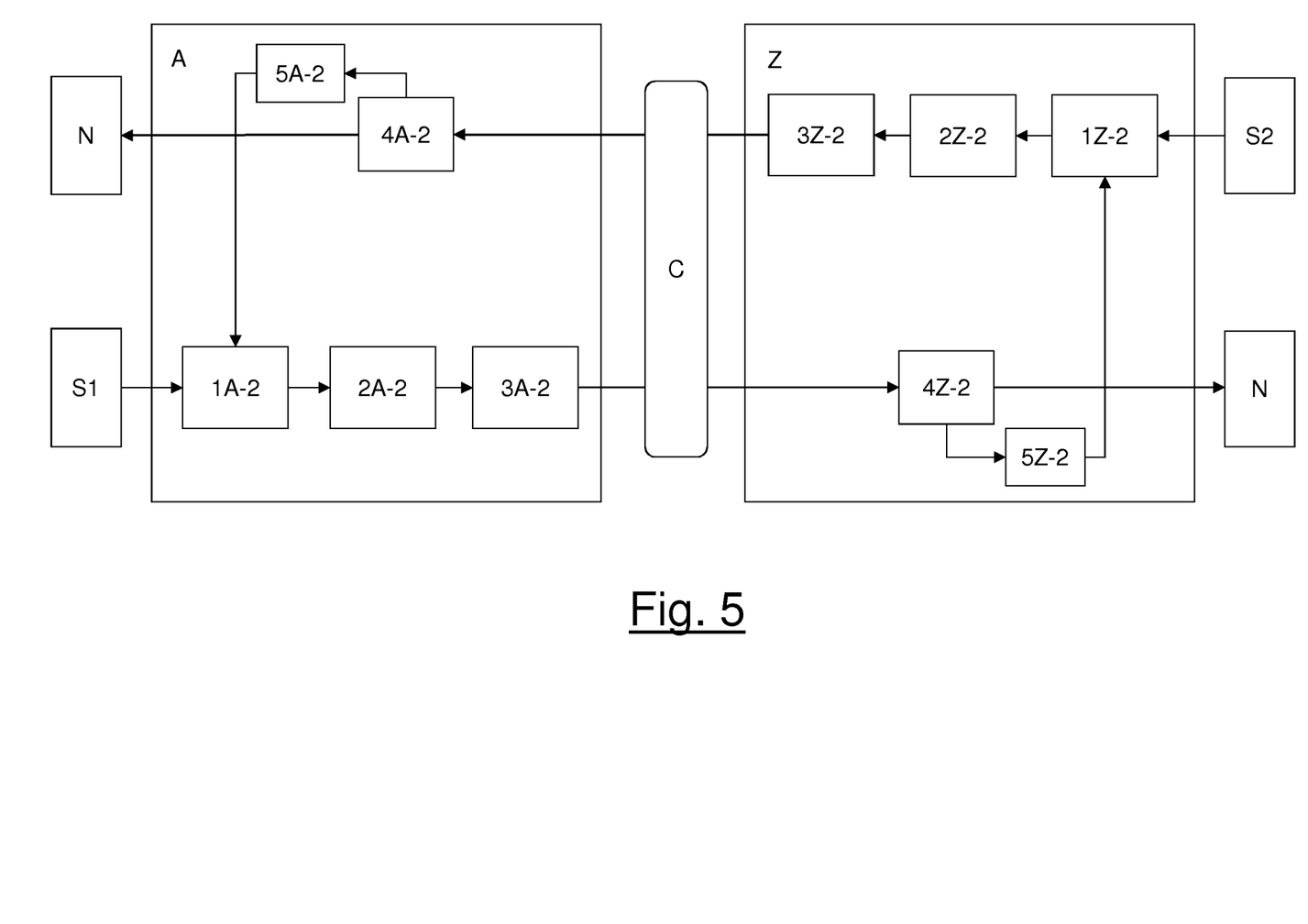
FIG. 5 is a block scheme of the routers according to a second embodiment of the present invention.

FIG. 5 shows a block scheme of the first router A and the second router Z according to a second embodiment of the present invention. According to this embodiment, a bidirectional communication is established between the first router A and the second router Z. In particular, a first data traffic generated by a first source S1 is preferably transmitted from the first router A to the second router Z, while a second data traffic generated by a second source S2 is preferably transmitted from the second router Z to the first router A. The block scheme depicted in FIG. 5 is merely exemplary as other network elements (such as further routers) may be interposed between the first and second source S1, S2 and the first router A and second router Z, respectively.

The first router A preferably comprises a rate limiter 1A-2, a packet counting module 2A-2 and a policer 3A-2 connected in cascade from an input interface of the first router A to an output interface towards the server network C. The block indicated as "rate limiter 1A-2" preferably incorporates the functions of a feedback module as described above with reference to block 6Z-1 of FIG. 2. Further, the first router A preferably comprises a packet checking module 4A-2 and an alert generating module 5A-2. The block indicated as "packet checking module 4A-2" preferably incorporates the functions of a feedback controller as described above with reference to block 7A-1 of FIG. 2. The packet checking module 4A-2 is connected to an input interface from the server network C. Further, the packet checking module 4A-2 is connected to the alert generating module 5A-2 that provides a feedback command to the feedback module of the rate limiter 1A-2.

The structure of the second router Z is similar to the structure of the first router A described above, hence a detailed description of the components of the second router Z will be omitted. In FIG. 5, correspondent components of the first router A and the second router Z are indicated with similar references, wherein letter "A" or "Z" indicates their location in the first router A or second router Z respectively. Moreover, the first router A and the second router Z perform the same operations on the data traffic generated by the first source S1 and the second source S2, respectively. Hence, the following description, for sake of conciseness, will mainly focus on the operation of the first router A and the second router Z on the data traffic generated by the first source S1.

The data traffic generated by the first source S1 is processed at the first router A, which shall send the packets of the data traffic to the second router Z though the server network C on a VLAN sub-interface. As already described above with reference to FIG. 2, the rate limiter 1A-2 preferably adjusts the bandwidth of the data traffic to be sent over the considered VLAN sub-interface. The packet counting module 2A-2 preferably identifies each best effort packet of the data traffic and marks it with the control code, which is set as already described above with reference to actions A-i to A-v. These operations on the best effort packets are performed as already described above with reference to the first embodiment of the present invention. The policer 3A-2 preferably receives all the packets of the data traffic to be sent over considered VLAN sub-interface (namely, the best effort traffic flow after being processed by the packet counting module 2A-2 and other traffic flows with different priorities, such as the high priority traffic flow) and queues them to the physical interface of the first router A towards the server network C.

At the second router Z, for each best effort packet, the packet checking module 4Z-2 preferably checks the control code inserted therein. In the meanwhile, the packet checking module 4Z-2 preferably sets an alert counter to an initial value preferably equal to 0. Then, the packet checking module 4Z-2 preferably performs the actions Z-i and Z-ii already described above.

The alert checking module 5Z-2 preferably compares the current value of the alert counter with a predetermined threshold value (for instance, equal to 3). If the value of the alert counter reaches the threshold, the alert checking module 5Z-2 preferably selects a value for the feedback code indicating a control sequence violation (e.g. a value equal to 1). Then it preferably generates and sends a corresponding feedback command to the feedback module incorporated in the rate limiter 1Z-2. The feedback module, upon reception of the feedback command, preferably inserts the feedback code into at least one best effort packet of the data traffic generated by the second source S2 and transmitted by the second router Z towards the server network C.

More preferably, the selected value of the control code is inserted in all the best effort packets of the data traffic transmitted by the second router Z on a VLAN sub-interface basis, until the first router A takes a consequent action to reduce the bandwidth, as described above with reference to the first embodiment, and at least one control sequence is again correctly received within the best effort packets at the second router Z. The feedback code is preferably inserted in the best effort packets in correspondence of the control code bits (e.g. the three least significant bits of the DSCP).

At the first router A, the packet checking module 4A-2 preferably receives the packets of the data traffic sent by the second router Z over the considered VLAN sub-interface. These packets may comprise the best effort packets carrying the feedback code as described above. Then, for each best effort packet carried over the VLAN sub-interface, the packet checking module 4A-2 preferably checks the control code bits.

If the packet checking module 4A-2 detects a sequence of best effort packets (for instance, three consecutive best effort packets) comprising the feedback code, namely packets whose control code bits carry a value equal to the predetermined fixed value used to indicate a control sequence violation (i.e., 1, according to the example above), it preferably generates a bandwidth adjustment command to the rate limiter 1A-2 (for simplicity, a direct connection between the packet checking module 4A-2 and the rate limiter 1A-2 has been omitted in FIG. 5). The bandwidth adjustment command preferably indicates to reduce the bandwidth of the considered VLAN sub-interface, as already described above with reference to the first embodiment of the present invention.

In the absence of the sequence of best effort packets carrying the feedback code, the rate limiter 1A-2 preferably increases the bandwidth of the considered VLAN sub-interface at discrete steps, as already described above with reference to the first embodiment. In particular, the rate limiter 1A-2 increases the bandwidth when, at the first router A, a number of consecutive received best effort packets is marked with values of the control code comprising a predetermined number (e.g. three) of consecutive control sequences.

Moreover, the packet checking module 4A-2 and the alert checking module 5A-2 preferably process the packets received from the second router Z as already described above with reference to the packet checking module 4Z-2 and the alert checking module 5Z-2 of the second router Z. In particular, if the alert counter at the alert checking module 5A-2 reaches the threshold value, the alert checking module 5A-2 preferably selects a value for the feedback code indicating a control sequence violation (e.g. a value equal to 1).

Then it preferably generates and sends a corresponding feedback command to the feedback module incorporated in the rate limiter 1A-2. The feedback module, upon reception of the feedback command, preferably inserts the feedback code in the best effort packets of the traffic processed by the rate limiter 1A-2 to be sent from the first router A to the second router Z, as described above. Then, the packet counting module 2A-2 and the policer 3A-2 of the first router A operate as described above with reference to the corresponding modules of the second router Z.

Advantageously, the present invention allows providing a method for controlling the bandwidth over a variable link, in particular a radio link, which allows exploiting the network resources in an efficient way. Indeed, the bandwidth of a best effort traffic flow is dynamically adjusted by taking into consideration the conditions of the variable link, which may vary due to fading because of changing the weather conditions and due to application of an adaptive coding and modulation technique on the server network. When missing packets are detected, the bandwidth of the best effort traffic flow may be decreased by discrete steps so as to avoid further losses. The bandwidth of the best effort traffic flow may be increased when no violations are detected. In this way, managing the available bandwidth is extremely efficient.

Moreover, implementing the method of the present invention does not require specific hardware and/or software implementations on the radio transceivers. Indeed, the dynamic adaptation of the bandwidth is managed by the routers.

Finally, the method according to the present invention may be advantageously applied on a sub-interface basis or on a logical port basis, and hence it allows a finer granularity for controlling the bandwidth with respect to methods that only allow controlling the bandwidth of the physical interface.

The invention claimed is:

1. A method for controlling a bandwidth over a variable communication link connecting a first client network element and a second client network element, wherein the first client network element is configured to send to the second client network element data traffic comprising at least a best effort traffic flow of packets and there are at least two packet flows traversing the variable communication link, the method comprising:
at the first client network element, marking a number of best effort packets of the best effort traffic flow with a respective control code, the control code taking, in each of the number of best effort packets, a value within a predetermined ordered control sequence of values, and sending the marked best effort packets to the second client network element through the variable communication link, the control sequence of values in the best effort packets being a triangle sequence of values in a range between a minimum integer value and a maximum integer value;
at the second client network element, checking the control code of each marked best effort packet and, in case of detection of a missing value of the control code within the control sequence, sending to the first client network element a packet containing a feedback code indicative of an adjustment of a bandwidth of the variable communication link to be taken by said first client network element; and
at the first client network element, upon reception of the packet containing the feedback code, adjusting the bandwidth of the variable communication link.

2. The method according to claim 1, wherein the marking at the first client network element comprises writing the control code into a number of bits of a header of the best effort packet.

3. The method according to claim 2, wherein the number of bits is comprised in a diffsery field of an interne protocol header of the best effort packet.

4. The method according to claim 1, wherein the checking at the second client network element comprises setting an alert counter to an initial value and incrementing the alert counter by 1 in case of the detection of one missing value of the control code within the control sequence.

5. The method according to claim 4, wherein the checking at the second client network element further comprises comparing a current value of the alert counter with a threshold, and wherein the sending to the first client network element a packet containing a feedback code is performed when the current value of the alert counter exceeds the threshold.

6. The method according to claim 1, wherein the packet containing a feedback code is a best effort packet sent from the second client network element to the first client network element.

7. The method according to claim 1, wherein the feedback code takes a fixed value selected within the predetermined ordered control sequence of values.

8. The method according to claim 1, wherein the feedback code is indicative of a reduction of the bandwidth.

9. The method according to claim 8, wherein at the first client network element the adjusting the bandwidth comprises reducing the bandwidth by a predetermined discrete amount.

10. The method according to claim 9, wherein the predetermined discrete amount is a fixed fraction of a total bandwidth of the best effort traffic flow.

11. The method according to claim 1, further comprising, at the first client network element, increasing the bandwidth when the best effort packets are marked with control codes comprising a pre-determined number of the control sequences without receiving, in the meanwhile, any packet containing the feedback code from the second client network element.

12. The method according to claim 11, wherein the increasing comprises increasing the bandwidth by a further predetermined discrete amount.

13. A communication network comprising:
a first client network element and a second client network element connected through a variable communication link,
wherein the first client network element is configured to send to the second client network element data traffic comprising at least a best effort traffic flow of packets, and the variable communication link carries at least two traffic flows;
wherein the first client network element is configured to:
mark a number of best effort packets of the best effort traffic flow with a respective control code, the control code taking, in each of the number of best effort packets, a value within a predetermined ordered control sequence of values, the control sequence of values in the best effort packets being a triangle sequence of values in a range between a minimum integer value and a maximum integer value; and
send the marked best effort packets to the second client network element through the variable communication link;
wherein the second client network element is configured to:
check the control code of each marked best effort packet and, in case of detection of a missing value of the control code within the control sequence, send to the first client network element a packet containing a feedback code indicative of an adjustment of a bandwidth of the variable communication link to be taken by said first client network element; and wherein the first client network element is further configured to, upon reception of the packet containing the feedback code, adjust the bandwidth of the variable communication link.

14. The communication network according to claim 13, wherein the bandwidth is the bandwidth of a VLAN sub-interface of a physical interface of the first client network element and the second client network element towards the variable communication link.

15. The communication network according to claim 13, wherein said feedback code is a fixed value selected within said predetermined ordered control sequence of values.

* * * * *